(12) United States Patent
Carpoff

(10) Patent No.: US 9,184,628 B2
(45) Date of Patent: Nov. 10, 2015

(54) PORTABLE SOLAR POWER TRAILER WITH ROTATABLE PANELS

(76) Inventor: Jeff Carpoff, Concord, CA (US)

( * ) Notice: Subject to any disclaimer, the term of this patent is extended or adjusted under 35 U.S.C. 154(b) by 723 days.

(21) Appl. No.: 13/397,874

(22) Filed: Feb. 16, 2012

(65) Prior Publication Data

US 2012/0206087 A1    Aug. 16, 2012

Related U.S. Application Data

(60) Provisional application No. 61/443,602, filed on Feb. 16, 2011.

(51) Int. Cl.
| | |
|---|---|
| *H01M 10/46* | (2006.01) |
| *H02J 7/35* | (2006.01) |
| *H02S 20/30* | (2014.01) |
| *H02S 10/40* | (2014.01) |
| *H01L 31/042* | (2014.01) |
| *H02J 3/38* | (2006.01) |

(52) U.S. Cl.
CPC ............. *H02J 7/355* (2013.01); *H01M 10/465* (2013.01); *H02J 7/35* (2013.01); *H02S 10/40* (2014.12); *H02S 20/00* (2013.01); *H02S 20/30* (2014.12); *H02J 3/383* (2013.01); *Y02E 10/50* (2013.01)

(58) Field of Classification Search
CPC ............. H02J 7/35; H02J 7/355; H02J 3/383; Y02E 10/50; H01M 10/465; H02S 10/40; H02S 20/30
USPC .......................................... 320/101; 136/246
See application file for complete search history.

(56) References Cited

U.S. PATENT DOCUMENTS

| | | | | |
|---|---|---|---|---|
| 4,628,142 | A * | 12/1986 | Hashizume | 136/246 |
| 7,795,837 | B1 * | 9/2010 | Haun | H01M 10/441 |
| | | | | 136/244 |
| 2010/0109601 | A1 * | 5/2010 | Coyle et al. | 320/102 |
| 2010/0207452 | A1 * | 8/2010 | Saab | 307/65 |
| 2010/0232148 | A1 * | 9/2010 | Sharpley | B60P 3/18 |
| | | | | 362/183 |
| 2011/0056146 | A1 * | 3/2011 | Appert | 52/79.1 |
| 2011/0073161 | A1 * | 3/2011 | Scanlon | 136/246 |
| 2011/0084553 | A1 * | 4/2011 | Adest et al. | 307/63 |
| 2011/0132353 | A1 * | 6/2011 | Gumm et al. | 126/680 |
| 2011/0176256 | A1 * | 7/2011 | Van Straten | 361/601 |
| 2012/0025750 | A1 * | 2/2012 | Margo | 320/101 |
| 2012/0125401 | A1 * | 5/2012 | DeVillier | 136/246 |
| 2012/0201015 | A1 * | 8/2012 | Robertson | F21L 4/08 |
| | | | | 362/183 |
| 2012/0201016 | A1 * | 8/2012 | Robertson et al. | 362/183 |
| 2014/0190551 | A1 * | 7/2014 | French, Sr. | 136/245 |
| 2014/0285005 | A1 * | 9/2014 | Casteel | H02S 10/40 |
| | | | | 307/23 |
| 2015/0215587 | A1 * | 7/2015 | Carpoff | F21L 13/00 |
| | | | | 348/143 |

* cited by examiner

*Primary Examiner* — Yalkew Fantu
*Assistant Examiner* — Manuel Hernandez
(74) *Attorney, Agent, or Firm* — Terra Law LLP; P.J. Benedict O'Mahoney

(57) ABSTRACT

A standalone portable solar power system includes a trailer, solar panels mounted on rotating beams, a battery, a battery management system, an inverter and a power outlet. The trailer can be towed and the first and second groups of solar panels are locked in a vertically orientation for transportation. At the use site, the trailer can be positioned with the rotating beams parallel with the equator and the solar panels rotated to captures the maximum amount of sunlight.

18 Claims, 5 Drawing Sheets

PORTABLE SOLAR POWER TRAILER WITH ROTATABLE PANELS

CROSS REFERENCE TO RELATED APPLICATIONS

This application claims priority to U.S. Provisional Application No. 61/443,602, "Standalone Portable Solar System" filed on Feb. 16, 2011 which is hereby incorporated by reference.

BACKGROUND

A solar power system uses one or more solar panels to convert sunlight into electricity. Solar power systems consist of multiple components, including the photovoltaic modules, mechanical and electrical connections and mountings and means of regulating or modifying the electrical output. Solar power supplies have been supplying power to many fixed structures such as homes, buildings and other structures. The solar panels can be placed on the roofs of these structures or at areas of land adjacent to the structures. This configuration works well with fixed buildings because the panels can be mounted and left indefinitely. However, in some applications, temporary or emergency electrical power may be needed. In order to solve this problem, what is needed is a standalone portable solar power system.

SUMMARY OF THE INVENTION

The present invention is directed towards a standalone portable solar power system. The solar power system can have a plurality of solar panels mounted on a trailer having a frame, a trailer hitch on the front end of the frame and wheels on opposite side of the frame around the mid section of the frame but behind the center of balance of the portable solar power system. The frame can support a plurality of rechargeable batteries, a battery management system, an inverter and a power outlet.

Vertical posts can be mounted on the trailer and rotatable horizontal beams can be mounted between the posts. Mounting brackets can be coupled to the rotatable beams and the solar panels can be attached to the mounting brackets. The horizontal beams can be aligned with the length of the trailer. The solar panels can be rotated on the horizontal beams to the desired position and then a locking mechanism can be used to hold the solar panels in the desired position and prevent the solar panels from rotating.

When the trailer is moving, the solar panels can be rotated so that they are vertically aligned with the back surfaces of the solar panels facing outward. The panels are also aligned with the direction of movement, so that the panels will have a minimum wind resistance and provide directional stability. This reduced wind resistance and stability are important because the trailer may be towed on freeways and should be capable of safely moving at speeds exceeding 70 miles per hour.

The portable solar power system can be used in emergency situations where backup power is needed. For example, FCC may require that carriers provide sufficient emergency/backup power at their cell sites. These backup power rules may require that each cell site have eight hours of backup power. Thus, when there is a power outage at a cell tower, the service provider can be notified and a portable solar power system can be moved to the site before the backup power runs out. Once at the required location, the portable solar power system can be positioned to optimize the amount of sunlight exposure provided to the solar panels. In an embodiment, the trailer can be positioned with rotatable horizontal beams parallel with the equator. The solar panels can then be rotated to be close to perpendicular to the arc of the sun across the sky. The solar panels can be locked in these positions.

During the day, the solar panels can convert light into DC electrical energy which is used to charge the batteries. The DC power can also be transmitted to an inverter which converts the DC power to AC power. The AC power from the inverter is then transmitted to electrical outlets. The electrical plugs can be plugged into the electrical outlet which provides electrical power to the devices. At night the solar panels will not be exposed to light and will stop producing electricity. When the solar panels stop producing power, the stored power in the batteries can be transmitted to the inverter and converted into AC power that is transmitted to the outlet.

DETAILED DESCRIPTION

Figure 1:
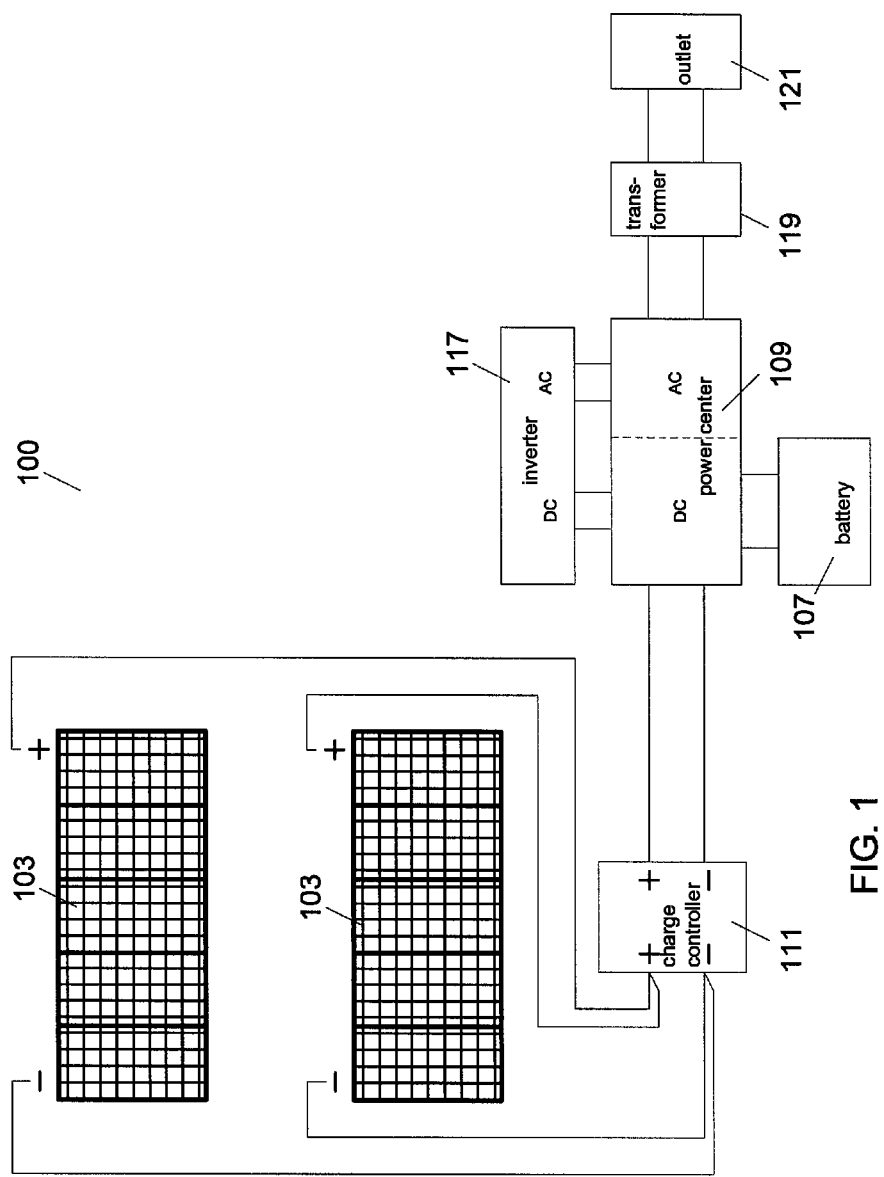
FIG. 1 illustrates a block diagram of the electrical components of the solar power system.

With reference to FIG. 1, the present invention is directed towards a standalone portable solar power system 100 which does not have a connection to the electricity "mains" or a power grid. The solar power system 100 can include one or more solar arrays 103 which convert sunlight into electricity. The solar arrays 103 are electrically coupled to a battery 107 and the power generated by the solar arrays 103 is stored and buffered with a battery 107. In an embodiment, the batteries 107 can be lead acid batteries. However, in other embodiments, any other type of rechargeable battery can be used.

A charge controller 111 may be incorporated in the solar power system 100 between the solar arrays 103 and the battery 107. The charge controller 111 can be used to prevent battery damage from excessive charging or discharging. The voltage output from the solar panels 103 can be proportional to the amount of sunlight that is collected by the solar arrays 103. Thus, the brighter the sunlight, the more voltage the solar arrays 103 produce. However, the excessive voltage can damage the batteries. Thus, the charge controller 111 is used to maintain the proper charging voltage on the batteries 107. As the input voltage from the solar arrays 103 rises, the charge controller 111 regulates the charge to the batteries 107 to prevent any over charging.

The charge controller 111 can have what is known as a 3 stage charge cycle which includes bulk, absorption and float stages. During the bulk stage of the charge cycle, the charge controller 111 can let the charge voltage to the battery 107 gradually rises to the bulk level. In an embodiment, the batteries can be configured in series so that cumulative voltage is 48 volts. The bulk level can be between about 57.6 and 58.4 volts while the batteries 107 draw maximum current. When the bulk level voltage is reached by the batteries 107, the absorption stage begins. During the absorption stage the battery 107 voltage can be maintained at bulk voltage level for a specified time while the current gradually tapers off as the batteries 107 charge up. After the absorption time passes the battery 107 voltage can be lowered to float level which can be between about 53.6 to 54.4 volts and the batteries 107 can draw a small maintenance current until the next cycle.

The charge controller 111 can use Pulse Width Modulation (PWM) or Maximum Power Point Tracking (MPPT). If the charge controller 111 includes MPPT, the charge controller 111 can match the output of the solar panels 103 to the battery 107 voltage to insure maximum charge (amps). A MPPT type charge controller 111 can compensate for a low battery voltage by delivering increased current if the battery voltage is below the optimum level. This adjustment allows the MPPT charge controller 111 to always output the optimum charging power to the battery 107. In a preferred embodiment, the battery 107 is fully charged prior to delivering the standalone portable solar power system 100 to the application site.

A AC/DC power center 109 can be coupled between the charge controller 111 and the battery 107. The DC portion of the AC/DC power center 109 can include various breakers and bypass switches. For example, the AC/DC power center 109 may include a first DC breaker which prevents excessive current from being transmitted from the solar panels 103 to the batteries 107 and a second DC breaker which prevents excessive power from being drawn from the system. In an embodiment, the first and second DC breakers may each be set for 250 A. The AC/DC power center 109 can also include an AC section which can include a switch which can break the AC power from the inverter 117 to the outlet 121. In an embodiment, the AC/DC power center 109 can be a Magnum MMP 250-60S.

Power from the battery 107 and solar arrays 103 can be transmitted through the AC/DC power center 109 to an inverter 117 to convert the direct current (DC) electrical energy into alternating current (AC). For example, in an embodiment, the solar panel arrays 103 may each product 48 volts DC and the batteries 107 may be configured to store electrical power with a 48 volt DC output. The inverter may convert the DC voltage from the solar panel arrays 103 and the batteries 107 into an AC output. For example, the inverter 117 can convert 48 volt DC into 120 volt AC with a cycle frequency of 60 Hz. In other embodiments the voltage output can be any other suitable level. In an embodiment, the inverter 117 can be a Sunny Island 5048-US.

If 240 volt AC or any other voltage is needed, the 120 volt AC from the inverter 117 can be transmitted to a transformer 119. The transformer 119 can convert the 120 volt AC into 240 volt AC which is then transmitted to the outlet 121. The outlet can have receptacles that correspond to the voltage output. For example, if the output is 120 volt AC, the outlet 121 receptacles can be common three prong wall sockets. However, if the output is 240 volt AC, the receptacles can be a different 240 volt socket configuration.

Figure 2:
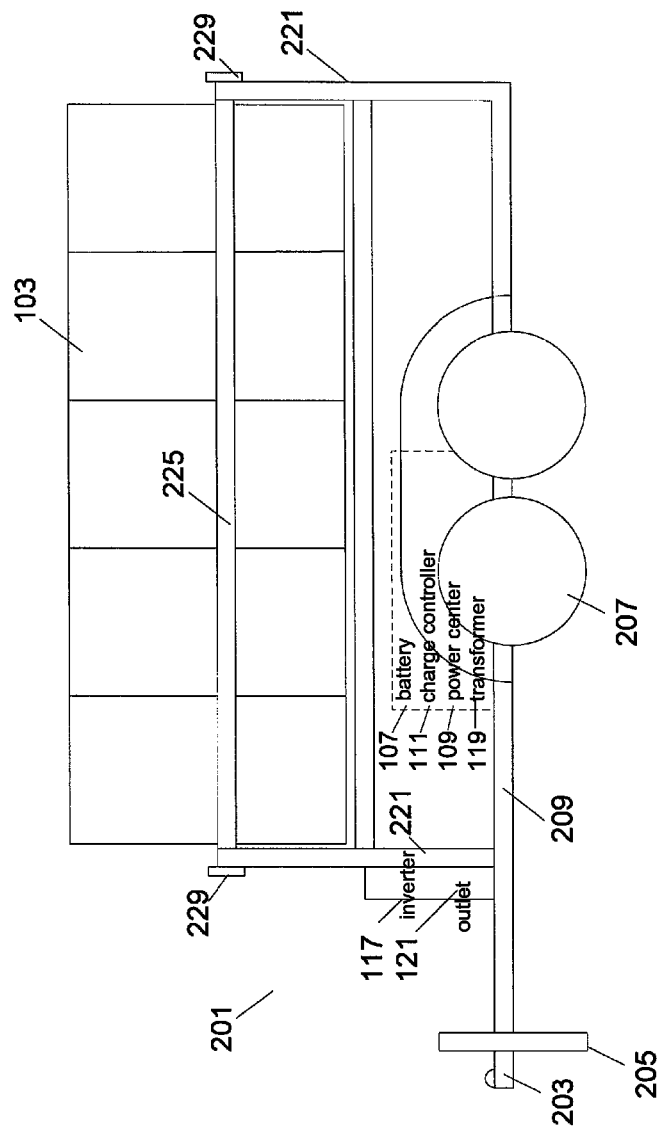
FIG. 2 illustrates a side view of an embodiment of the portable solar power system.
Figure 3:
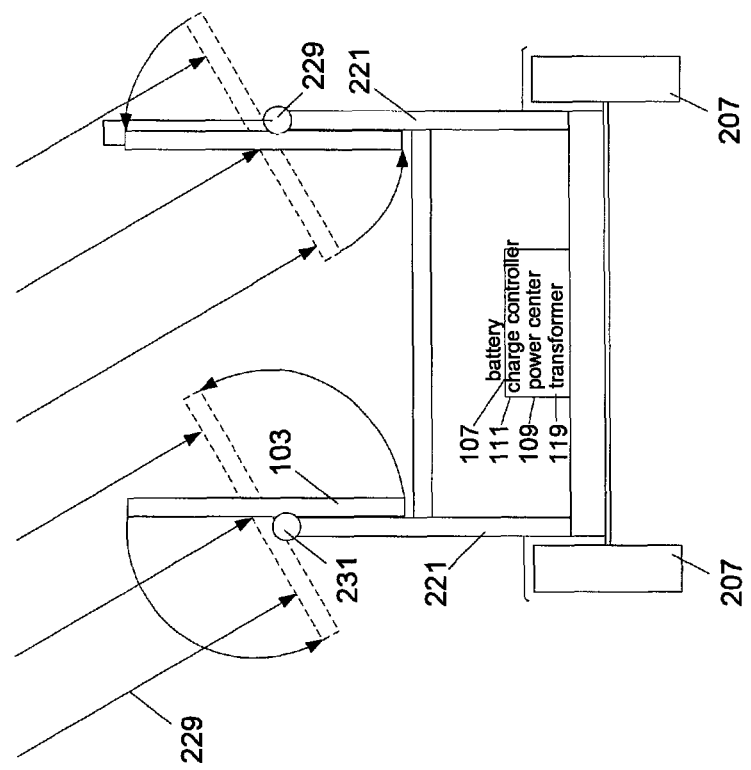
FIG. 3 illustrates a rear view of an embodiment of the portable solar power system.

With reference to FIGS. 2 and 3 a more detailed view of the trailer 201 used to transport the solar cell array 103 and other system components is illustrated. The trailer 201 can include a frame 209, wheels 207, a hitch 203 coupled to a front end of the trailer frame 209 and a stand 205 for supporting the trailer frame 209 when the trailer 201 is not being towed. Vertical posts 221 can be coupled to the frame 209 and rotatable horizontal beams 225 can be mounted to the tops of the posts 221 and extend between the posts 221. Bearings or bushings may be used at the connection points between the posts 221 and the horizontal beams 225 to allow the horizontal beams 225 to rotate easily.

The solar panel arrays 103 can be mounted on the horizontal beams 225. Additional brackets can be mounted to the horizontal beams 225 to further support the solar panel arrays 103. The trailer 201 may have a center axis and the wheels 207 can be mounted on opposite sides of the center axis. In an embodiment, the inverter 117 and the outlet 121 can be mounted to a front portion of the trailer frame 209 so that these components are easily accessible. In an embodiment, the batteries 107, the AC/DC power center 109, charge controller 111 and transformer 119 can be mounted in a center portion on the trailer frame 209. However, in other embodiments, these components can be mounted on other portions of the trailer frame 209.

The trailer 201 can be fabricated to any dimensions. However, in an embodiment, the trailer should be easily driven on public roads and the trailer 201 should fit within standard traffic lanes. The width may be about 70 to 102 inches which is the maximum legal width for most U.S. highways. The length of the trailer can be about 16 to 40 feet in length. With the solar panels 103 in the vertical position, the height of the portable solar power system can be about 70 to 150 inches. The posts 221 may be about 30-60 inches high. The trailer 201 can be made of steel tubing which can have circular, square or rectangular cross sections. For example, the frame may be made of 2"×3" or 3"×3" steel tube.

With reference to FIG. 3, the rotatable horizontal beams 225 and the solar panel arrays 103 can be aligned with the wheels 207 so that when the trailer 201 is being towed, the apparent wind will be in line with the horizontal beams 225 and the solar panel arrays 103. In the moving configuration, the solar panel arrays 103 can be rotated so that the light absorbing surfaces are facing inward and the back surfaces can face outward. The solar panels 103 can be vertically aligned with the back surfaces of the solar panels facing outward. This configuration minimizes the width of the trailer 201. Since the panels 103 are also aligned with the direction of movement, the trailer 201 will have a minimum wind resistance and the panels 103 may provide directional stability. The reduced wind resistance and stability are important because the trailer 201 may be towed at freeway speeds and should be capable of safely moving at speeds exceeding 70 miles per hour. In an embodiment, the stability of the portable solar power system can be further improved by placing the heavy components such as the batteries 107, the inverter 117, charge controller 111 and transformer 119 as low as possible on a center portion on the trailer frame 209.

When the trailer 201 is brought to the power delivery site, the portable solar power system can be positioned to optimize the amount of sunlight exposure provided to the solar panel arrays 103. In an embodiment, the trailer 201 can be positioned with rotatable horizontal beams 225 parallel with the equator. The solar panels can then be rotated to be close to perpendicular to the arc of the sun across the sky. Light rays 229 can contact the solar panels 103 at a perpendicular angle with maximum exposure at about noon time. In the morning and afternoon, the exposure will decrease due to the angle of the sun and light rays 229. The trailer 201 can include locking mechanisms 231 which lock the solar panels 103 in the optimum light ray 229 absorption positions. Although the solar panel arrays 103 are illustrated at the same angle, in other embodiments, it may be more efficient to have the solar panel arrays 103 set at different angles. The product design may give the portable solar power system the ability to maximize exposure to the sun regardless of latitude or seasonal variations.

During the day, the solar panels 103 can convert light into DC electrical energy which is used to charge the batteries 107. The DC power from the solar panels 103 is also transmitted to the inverter 117 which converts the DC power into AC power. The AC power from the inverter 117 is then transmitted to electrical outlets 121. The electrical plugs can be plugged into the electrical outlet 121 which provides electrical power to the devices. At night the solar panels 103 will not be exposed to light and will stop producing electricity and the stored electrical power in the batteries 107 can be transmitted to the inverter 117 and converted into AC power that is transmitted to the outlet 121.

Figure 4:
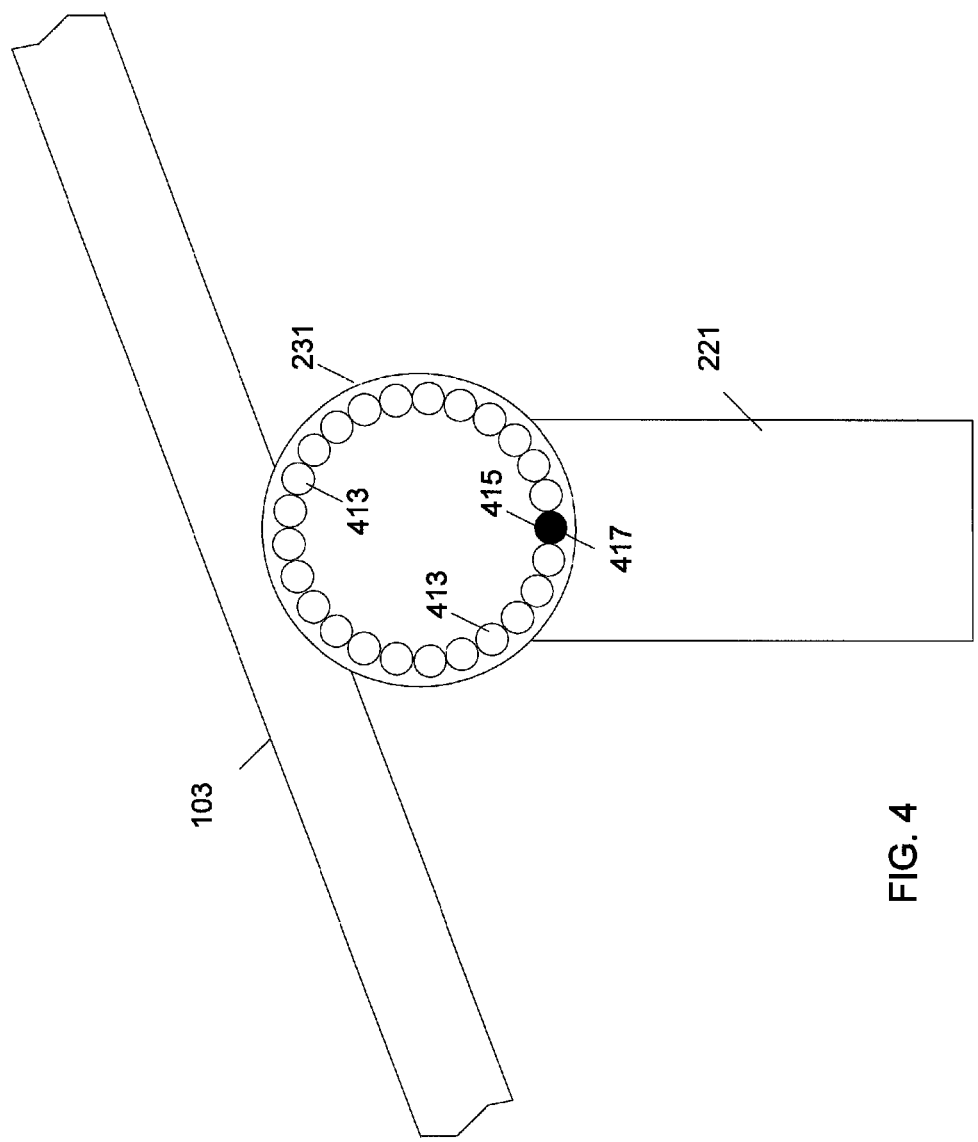
FIG. 4 illustrates a view of a solar panel array locking mechanism.

With reference to FIG. 4, the locking mechanism 231 can include a ring 411 rigidly mounted to an end of the horizontal beams. The ring 411 can include a plurality of holes 413 arranged in a circular pattern. A hole having a similar diameter can be in the post 221 behind the ring 411. The solar panel array 103 can be rotated to the desired position and a pin 415 can be placed in the hole 417 that is aligned with the hole in the post 221. In an embodiment, the plurality of holes 413 can be configured at uniform degree angles between adjacent holes. For example, the holes may be set at 10 degree or 15 degree increments. In other embodiments, any other incremental angle can be used. This locking mechanism can be placed on each post 221 on the trailer 201. While an exemplary locking mechanism has been illustrated, in other embodiments, any other suitable rotational locking mechanism can be used.

Figure 5:
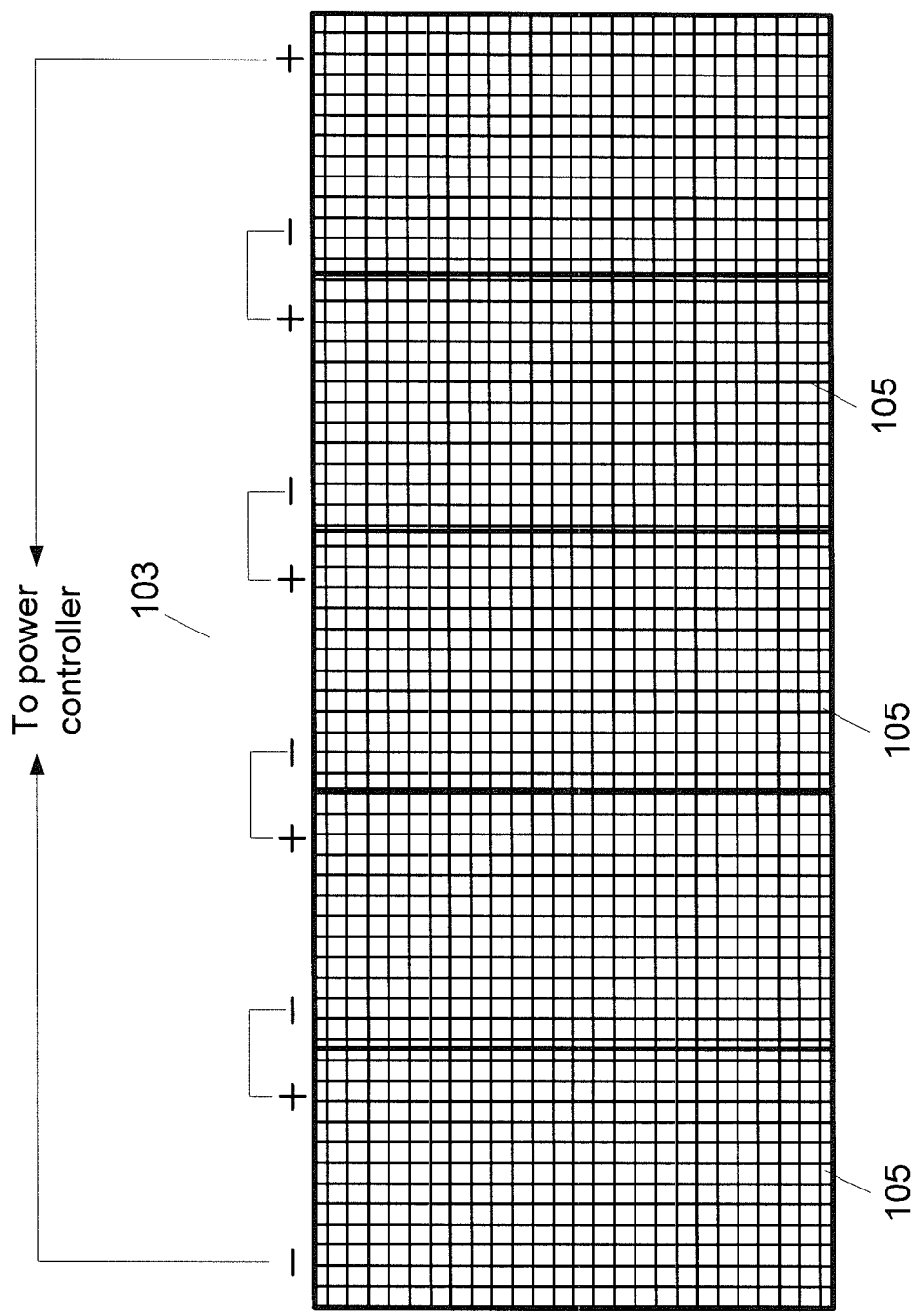
FIG. 5 illustrates a view of an embodiment of a solar panel array.

With reference to FIG. 5, a more detailed view of the solar panel array 103 is illustrated. Due to the low voltage of individual solar cells which typically output 0.5V, several solar cells can be wired in series and mounted within a protective weatherproof enclosure to form the solar panel modules 105. The solar power panel modules 105 may be strung together in series to form the photovoltaic array 103. The solar panel modules 105 can be framed or attached together by struts in a panel structure. In an embodiment, each of the solar arrays 105 can produce an output of about 48 volts and 240 watts of electrical power. In an embodiment, the solar panel modules 105 can be manufactured with tempered glass, EVA lamination and a weatherproofed back-skin which typically provides a longer life and enhanced cell performance. The solar panel modules may be designed to withstand harsh operating conditions, which is important in a mobile system where the modules will be subjected to the bumps and vibrations experience from being driven over various road surfaces. In an embodiment, the solar panel modules can be AUO 240 Watt PV modules manufactured by Sharp.

In larger portable solar power system such as buildings and remote water pumps, AC electrical power may usually be required. The inventive mobile solar generators may be available in 5, 10, 15 and 20 kW power capacities. Their portable solar power system can be used in rural, agricultural, construction, entertainment and other urban capacities throughout the US where a portable solar power system is a more desirable alternative than a diesel powered generator. The portable solar power system is capable of operating anywhere that it can be transported which makes them useful in a number of environments including; agriculture; construction; entertainment such as festivals and carnivals; telecommunications for off-grid cell towers; and in emergency or disaster relief efforts.

It will be understood that the inventive system has been described with reference to particular embodiments, however additions, deletions and changes could be made to these embodiments without departing from the scope of the inventive system. Although the order filling apparatus and method have been described include various components, it is well understood that these components and the described configuration can be modified and rearranged in various other configurations.

What is claimed is:

1. A portable solar power system comprising:
    a trailer having a frame having a center axis, two wheels coupled to opposite sides of the center axis of the frame, a trailer hitch on the center axis and coupled to the frame for towing the trailer;
    a plurality of posts mounted to the frame of the trailer;
    a first beam rotatably coupled to the posts mounted at left front and left back portions of the frame;
    a second beam rotatably coupled to the posts mounted at right front and right back portions of the frame;
    a first group of solar panels mounted on the first beam;
    a second group of solar panels mounted on the second beam;
    a battery pack;
    a battery management system coupled between the first group of solar panels, the second group of solar panels and the battery pack, the battery management system receiving DC power from the first group of solar panels and the second group of solar panels, transmitting the DC power to the battery pack and preventing the battery pack from being over charged;
    an inverter coupled to the charge controller for converting DC power from the first group of solar panels and the second group of solar panels into AC power; and
    a power outlet coupled to the inverter for providing AC power to electrical devices;
    wherein the first beam and the second beam are parallel to the center axis of the trailer, the first group of solar panels and the second group of solar panels are each rotatable between vertical positions and angled positions over a rotational range that is greater than 90 degrees from the vertical positions; and
    wherein the first group of solar panels and the second group of solar panels each have a light absorbing side and a back side and the first group of solar panels and the second group of solar panels have a vertical transportation position achieved by rotating the first group of solar panels and the second group of solar panels axially around the first beam and second beam respectively whereby the back sides of the first group of solar panels and the second group of solar panels faces away from the center axis of the trailer and the light absorbing sides of the first group of solar panels and the second group of solar panels faces inward towards the center axis of the trailer.

2. The portable solar power system of claim 1 wherein an axis of rotation of the two wheels is substantially perpendicular to a first plane defined by the first group of solar panels and a second plane defined by the second group of solar panels in the vertical position.

3. The portable solar power system of claim 1 further comprising:
    a voltage transformer coupled between the inverter and the power outlet.

4. The portable solar power system of claim 3 wherein the voltage transformer receives 120 volt AC from the inverter and transmits 240 volt AC to the power outlet.

5. The portable solar power system of claim 1 wherein the first group of solar panels are electrically coupled in series and the second group of solar panels are electrically coupled in series.

6. The portable solar power system of claim 1 wherein the battery comprises
    a plurality of battery units coupled in series.

7. The portable solar power system of claim 1 wherein the battery is mounted on the center axis of the trailer between the two wheels.

8. The portable solar power system of claim 1 further comprising:
  locking mechanisms coupled to the plurality of posts which allow the first group of solar panels and the second group of solar panels to be locked at different fixed rotational positions.

9. The portable solar power system of claim 1 wherein the battery management system includes Maximum Power Point Tracking (MPPT).

10. The portable solar power system of claim 1 wherein the battery management system includes Pulse Width Modulation (PWM).

11. A portable solar power system comprising:
  a trailer having a frame having a center axis, two wheels coupled to opposite sides of the center axis of the frame, a trailer hitch on the center axis and coupled to the frame for towing the trailer;
  a plurality of posts mounted to the frame of the trailer;
  a first beam rotatably coupled to two or more of the posts;
  a first group of solar panels mounted on the first beam and rotatable between a vertical position and angled positions over a rotational range that is greater than 90 degrees;
  a battery that is charged by the first group of solar panels;
  an inverter coupled to the first group of solar panels and the battery for converting DC power into AC power; and
  an electrical outlet coupled to the inverter for providing AC power;
  wherein the first beam is parallel to the center axis of the trailer; and
  wherein the first group of solar panels and the second group of solar panels each have a light absorbing side and a back side and the first group of solar panels and the second group of solar panels have a vertical transportation position achieved by rotating the first group of solar panels and the second group of solar panels axially around the first beam and second beam respectively whereby the back sides of the first group of solar panels and the second group of solar panels faces away from the center axis of the trailer and the light absorbing sides of the first group of solar panels and the second group of solar panels faces inward towards the center axis of the trailer.

12. The portable solar power system of claim 11 further comprising:
  a second beam rotatably coupled to two or more of the posts; and a second group of solar panels mounted on the second beam and rotatable between a vertical position and angled positions over a rotational range that is greater than 90 degrees;
  wherein the battery that is charged by the second group of solar panels, the inverter is coupled to the second group of solar panels and the second beam is parallel to the center axis of the trailer.

13. The portable solar power system of claim 11 wherein an axis of rotation of the two wheels is substantially perpendicular to a first plane defined by the first group of solar panels and a second plane defined by the second group of solar panels in the vertical position.

14. The portable solar power system of claim 11 further comprising:
  a battery management system coupled between the first group of solar panels and the battery, the battery management system receiving DC power from the first group of solar panels and transmitting the DC power to the battery and preventing the battery from being over charged.

15. The portable solar power system of claim 11 further comprising:
  a voltage transformer coupled between the inverter and the power outlet.

16. The portable solar power system of claim 11 wherein the battery pack is mounted on the center axis of the trailer between the two wheels.

17. The portable solar power system of claim 11 further comprising:
  locking mechanisms coupled to the plurality of posts which allow the first group of solar panels to be locked at a fixed rotational position.

18. The portable solar power system of claim 11 wherein the battery management system includes Maximum Power Point Tracking (MPPT).

* * * * *